Patented Aug. 19, 1941

2,252,705

UNITED STATES PATENT OFFICE 2,252,705

MERCURI ALKYL PHENOL DERIVATIVES

Walter G. Christiansen, Glen Ridge, N. J., assignor to E. R. Squibb & Sons, New York, N. Y., a corporation of New York No Drawing. Application November 22, 1938, Serial No. 241,727

5 Claims. (Cl. 260—434)

This application is a continuation-in-part of application Serial No. 743,840, filed September 13, 1934, now Patent No. 2,137,236, dated November 22, 1938.

This invention relates to, and has for its object the provision of, certain mercuri alkyl phenol derivatives.

The mercuri alkyl phenol derivatives of this invention are members of the group consisting of

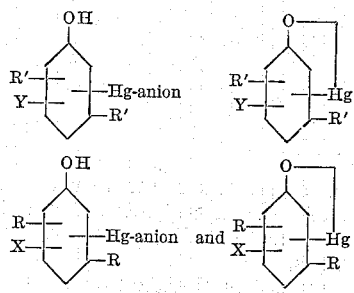

wherein R' represents a lower alkyl, preferably methyl, Y is a member of the group consisting of chloro and nitro, X is a member of the group consisting of halogen and nitro, one R represents a lower alkyl, preferably methyl, and the other R represents a lower—preferably branched chain—alkyl having at least three carbon atoms. They may be prepared by interacting the corresponding unmercurated alkyl phenol derivatives with mercuric acetate, and replacing the acetoxy with the desired anion by means of the compound of that anion with an alkali metal (cf. Whitmore's Organic Compounds of Mercury, 1921, pp. 257, 258). These mercuri phenol derivatives have been found to be active germicides.

The following examples are illustrative of the invention:

EXAMPLE 1

*Anhydro-mercuri 4-chloro 3,6-dimethyl phenol*

4 g. 4-chloro 3,6-dimethyl phenol is dissolved in 20 cc. methyl alcohol, and while the solution is refluxed on a steam-bath, 8 g. mercuric acetate dissolved in 20 cc. water slightly acidulated with acetic acid is added rapid-dropwise with mechanical stirring. After one and one-half hours of refluxing, a test for divalent mercury being negative and heavy white crystals having formed, the mixture is filtered; the residue, upon being washed successively with methyl alcohol, water, and methyl alcohol, and dried, is found to be soluble in dilute alkali.

EXAMPLE 2

*Anhydro-mercuri 4-chloro 3,5-dimethyl phenol*

This compound is prepared precisely in accordance with the preceding example except that 4-chloro 3,5-dimethyl phenol is substituted for chloro 3,6-dimethyl phenol.

EXAMPLE 3

*2-anhydro-mercuri 4-chloro 3,5-dimethyl phenol*

20 grams of 4-chloro 3,5-dimethyl phenol are dissolved in 100 cc. of methyl alcohol. The solution is filtered and heated to boiling whereupon a solution of 40 grams of mercuric acetate in 100 cc. of water, acidified by adding 1.7 cc. of acetic acid, are added. The mixture is then boiled under reflux until it no longer contains any inorganic mercury. The mixture is cooled and the solid which separates is collected on a filter, washed once with methyl alcohol, twice with water and twice more with methyl alcohol.

The solid, undried, is next suspended in a solution of 26 grams of sodium hydroxide in 500 cc. of water and stirred for two hours. Then 33 cc. of glacial acetic acid are stirred in for 15 minutes. The solid is then collected on a filter and washed with water until adhering sodium acetate and excess acetic acid have been removed, and finally dried at 100° C.

EXAMPLE 4

*Acetoxymercuri 3-methyl 4-chloro 6-isopropyl phenol*

9.25 g. 3-methyl 4-chloro 6-isopropyl phenol is dissolved in 50 cc. methyl alcohol, and while the solution is refluxed on a steam-bath, 14.7 g. mercuric acetate dissolved in 50 cc. water slightly acidulated with acetic acid is added. After five hours of refluxing, a test for divalent mercury being negative, the reaction mixture is filtered, washed, and dried as in Example 1, yielding the desired compound in the form of white crystals.

EXAMPLE 5

*Hydroxy mercuri 3-isopropyl 4-chloro 6-methyl phenol*

A solution of 8 g. 3-isopropyl 4-chloro 6-methyl phenol in 150 cc. ethyl alcohol is treated in the manner of Example 1 with 12.5 g. mercuric acetate in 45 cc. water. After twelve hours of refluxing, a test for divalent mercury being slightly positive and some crystals having formed, the mixture is filtered. The filtrate is made strongly alkaline with dilute alkali, and the grayish muddy precipitate is filtered out. The dark-red alkaline filtrate is acidified with dilute acetic acid, and the reddish-brown precipitate, the desired compound, is filtered off, washed with water and then with alcohol, and dried to a reddish powder, which gives a dark-red solution with dilute alkali.

EXAMPLE 6

*Acetoxymercuri 2-nitro-3,6-dimethyl phenol*

2.19 g. 2-nitro 3,6-dimethyl phenol is dissolved in 13 cc. methyl alcohol, and while the solution is refluxed on a steam-bath, 3.93 g. mercuric acetate dissolved in 13 cc. water slightly acidulated with acetic acid is added. After seven hours of refluxing, a test for divalent mercury being negative, the reddish-brown crystal precipitate, the desired compound, is filtered, washed, and dried as in Example 1, and is found to give a light-red solution with dilute alkali.

EXAMPLE 7

*Acetoxymercuri 3-methyl 4-nitro 6-isopropyl phenol*

2.5 g. 3-methyl 4-nitro 6-isopropyl phenol is dissolved in 13 cc. methyl alcohol, and while the solution is refluxed on a steam-bath, 4 g. mercuric acetate dissolved in 12 cc. water slightly acidulated with acetic acid is added. After seven hours of refluxing, a test for divalent mercury being negative, the crystalline yellowish precipitate, the desired compound, is isolated as in Example 1, and found to give an orange solution with dilute alkali.

The invention is, of course, not restricted to the above-described specific compounds. Thus, compounds wherein R and R' represent a lower alkyl other than those occurring in the above-described specific compounds may be prepared by mercurating halo or nitro phenols embodying the desired alkyls, e. g. ethyl, propyl, butyl, isobutyl, amyl, isoamyl, etc. Also, compounds wherein X is a halogen other than chloro may be prepared by using the corresponding—e. g. bromo—reactant.

Among the numerous other mercuri-derivatives that may be prepared in accordance with the invention are the chloro-, cyano-, thiocyano-, and nitrato-mercuri derivatives, which are formed by treating a solution of the acetoxymercuri derivative with, respectively, the chloride, cyanide, thiocyanide and nitrate of an alkali metal.

The invention may be variously otherwise embodied, within the scope of the appended claims.

I claim:

1. A compound of the general formula

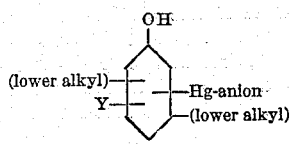

wherein Y represents a member of the group consisting of halogen and nitro, and at least one of the lower alkyl radicals has at least three carbon atoms.

2. A compound of the general formula

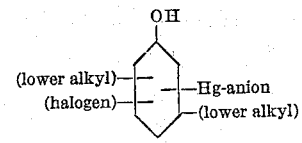

wherein at least one of the lower alkyl radicals has at least three carbon atoms.

3. A compound of the general formula

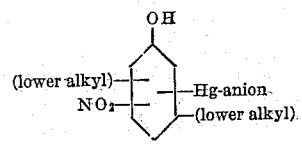

wherein at least one of the lower alkyl radicals has at least three carbon atoms.

4. A compound of the general formula

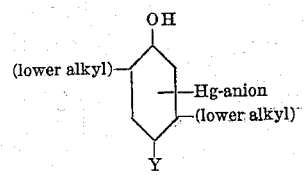

wherein Y represents a member of the group consisting of halogen and nitro, and at least one of the lower alkyl radicals has at least three carbon atoms.

5. A compound of the group consisting of

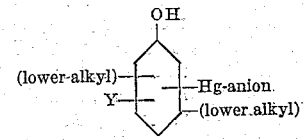

and

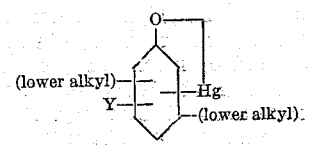

wherein Y represents a member of the group consisting of halogen and nitro, and at least one of the lower alkyl radicals has at least three carbon atoms.

WALTER G. CHRISTIANSEN.